United States Patent
Krajnik et al.

(10) Patent No.: US 8,013,092 B1
(45) Date of Patent: Sep. 6, 2011

(54) WATERBORNE COATING

(75) Inventors: John M. Krajnik, Shaker Heights, OH (US); Peter J. Mackulin, North Olmsted, OH (US); Pietro J. Ragone, Seven Hills, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 11/961,025

(22) Filed: Dec. 20, 2007

Related U.S. Application Data

(60) Provisional application No. 60/871,025, filed on Dec. 20, 2006.

(51) Int. Cl.
*C08F 20/00* (2006.01)
*C08F 20/06* (2006.01)
*C08F 118/02* (2006.01)

(52) U.S. Cl. ............... 526/303.1; 526/317.1; 526/319

(58) Field of Classification Search ............... 526/303.1, 526/317.1, 319
See application file for complete search history.

(56) References Cited

U.S. PATENT DOCUMENTS

| | | | |
|---|---|---|---|
| 4,144,212 A | 3/1979 | Linder et al. | |
| 4,514,552 A | 4/1985 | Shay et al. | |
| 4,703,080 A | 10/1987 | Shay et al. | |
| 4,722,962 A | 2/1988 | Shay et al. | |
| 4,801,671 A | 1/1989 | Shay et al. | |
| 5,292,828 A | 3/1994 | Jenkins et al. | |
| 5,292,843 A | 3/1994 | Jenkins et al. | |
| 5,294,693 A | 3/1994 | Egraz et al. | |
| 5,488,180 A | 1/1996 | Jenkins et al. | |
| 6,869,996 B1 | 3/2005 | Krajnik et al. | |
| 2005/0107527 A1* | 5/2005 | Holub et al. | 524/817 |
| 2007/0025944 A1* | 2/2007 | Feng et al. | 424/70.13 |

FOREIGN PATENT DOCUMENTS

DE 4341260 A1 5/1994

* cited by examiner

*Primary Examiner* — William K Cheung
(74) *Attorney, Agent, or Firm* — Eryn Ace Fuhrer; Robert E. McDonald; Arthi K. Tirey

(57) ABSTRACT

A waterborne coating produced form a composition containing a binder resin having post crosslinking groups, an associative thickener having post crosslinking groups, a dispersant having post crosslinking groups, and a reactive diluent having post crosslinking groups.

12 Claims, No Drawings

WATERBORNE COATING

CROSS REFERENCE TO RELATED APPLICATIONS

This application claims the benefit of co-pending U.S. Provisional Application 60/871,025 filed Dec. 20, 2006, the entirety of which is hereby incorporated by reference.

SUMMARY OF THE INVENTION

This invention relates to waterborne coating compositions comprising a binder resin having post crosslinking groups, an associative thickener having post crosslinking groups, an associative dispersant having post crosslinking groups, and a reactive diluent having post crosslinking groups. The coating composition of the present invention may be ambient cured, oven cured or radiation cured.

DETAILED DESCRIPTION OF THE INVENTION

Binder

The latex polymers used as binders in accordance with the present invention (also referred to herein as "binders") include those polymers polymerized from one or more suitable monomers. Typically, the binders are polymerized from one or more copolymerizable monoethylenically unsaturated monomers such as, for example, vinyl monomers and acrylic monomers.

Vinyl monomers suitable for use in accordance with the present invention include any compounds having vinyl functionality, i.e., ethylenic unsaturation, exclusive of compounds having acrylic functionality, e.g., acrylic acid, methacrylic acid, esters of such acids, acrylonitrile and acrylamides. In one embodiment of the invention, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers also include vinyl esters, such as, for example, vinyl propionate, vinyl laurate, vinyl pivalate, vinyl nonanoate, vinyl decanoate, vinyl neodecanoate, vinyl butyrates, vinyl benzoates, vinyl isopropyl acetates and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

The acrylic monomers suitable for use in accordance with the present invention comprise any compounds having acrylic functionality. Acrylic monomers may be selected from the group consisting of alkyl acrylates, alkyl methacrylates, acrylate acids and methacrylate acids as well as aromatic derivatives of acrylic and methacrylic acid, acrylamides and acrylonitrile. In one useful embodiment, the alkyl acrylate and methacrylic monomers (also referred to herein as "alkyl esters of acrylic or methacrylic acid") may have an alkyl ester portion containing from 1 to about 12, for example about 1 to 5, carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, 1-adamatyl methacrylate and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cycanoacrylic acid, crotonic acid, beta-acryloxy propionic acid, and beta-styryl acrylic acid.

In addition to the specific monomers described above, those skilled in the art will recognize that other monomers such as, for example, allylic monomers, or monomers which impart wet adhesion, e.g., methacrylamidoethyl ethylene urea, can be used in place of, or in addition to, the specifically described monomers in the preparation of the binders (as well as the dispersants and thickeners hereinafter described). Further details concerning such other monomers suitable for copolymerization in accordance with the present invention are known to those skilled in the art. The amount of such other monomers is dependent on the particular monomers and their intended function, which amount can be determined by those skilled in the art.

The binder polymer of the present invention has crosslinking functionality. At least one of the monomers used to polymerize the binder is a monoethylenically, unsaturated monomer containing "latent crosslinking" capabilities, which as used herein means a monomer which possesses the ability to further react some time after initial formation of the polymer. Activation can occur through the application of energy, e.g., through heat or radiation. Also, drying can activate the crosslinking polymer through changes in pH, oxygen content or other changes that causes a reaction to occur. The particular method of achieving crosslinking in the binder polymer is not critical to the present invention. A variety of chemistries are known in the art to produce crosslinking in latexes.

Examples of monomers which do not effect crosslinking until during film formation include carbonyl-containing monomers such as acrolein, methacrolein, diacetone acrylamide, diacetone methacrylamide and vinylaceto acetate. These monomers result in postcrosslinking, for example, when the aqueous polymer emulsion simultaneously contains an appropriate added amount of a polyamine compound. Particularly suitable compounds of this type are the dihydrazides and trihydrazides of aliphatic and aromatic dicarboxylic acids of 2 to 20 carbon atoms. Examples of these are oxalic dihydrazide, adipic dihydrazide and sebacic dihydrazide. Another monomer which produces postcrosslinking is, for example, 2-acetoacetoxyethyl methacrylate (alone or in combination with polyamines or polyaldehydes, such as glyoxal).

Other polymer building blocks which are suitable for postcrosslinking are those which contain hydrolyzable organosilicon bonds. Examples are the copolymerizable monomers methacryloyloxypropyltrimethoxysilane and vinyltrimethoxysilane. Further suitable polymer building blocks of a corresponding type are described in DE-A4341260. If the disperse polymer particles have carboxyl groups, postcrosslinking can also be effected by adding metal salts having polyvalent cations (for example Mg, Ca, Zn or Zr salts).

Epoxy-, hydroxyl- and/or N-alkylol-containing monomers, for example, glycidyl acrylate, N-methylolacrylamide and -methacrylamide and monoesters of dihydric alcohols with α,β-monoethylenically unsaturated carboxylic acids of 3 to 6 carbon atoms, such as hydroxyethyl, hydroxy-n-propyl or hydroxy-n-butyl acrylate and methacrylate are also suitable for postcrosslinking.

U.S. Pat. No. 4,144,212 describes an air-curing copolymer latex prepared by emulsion copolymerization in the presence of free radical polymerization catalysts such as inorganic or organic peroxide polymerization catalysts, with a blend (in % by weight based on the total weight of all monomers used) of (a) about 1% to about 20% of dicyclopentadienyl acrylate or dicyclopentadienyl methacrylate, (b) about 99% to about 20% of an alkyl acrylate or methacrylate, including mixtures of such monomers, and preferably a lower alkyl acrylate or methacrylate in which the alkyl groups contain from 1 to 4 carbon atoms, (c) 0% to about 5% of acrylic acid or methacrylic acid, and (d) 0% to about 85% of other monoethylenically unsaturated copolymerizable monomers, e.g., higher alkyl acrylates and methacrylates in which the alkyl groups contain from 5 to about 18 carbon atoms, acrylamide, methacrylamide, acrylonitrile or methacrylonitrile; also vinyl esters (e.g. vinyl acetate, vinyl propionate of vinyl chloride), styrene and alkyl vinyl ethers.

The binder resin of the present invention contains about 0.5 to about 10% by weight, based on the total weight of the polymer, of at least one monomer having latent crosslinking functionality, for example about 1 to about 6% by weight, based on the total weight of the polymer, of at least one monomer having latent crosslinking functionality.

The particle size of the binders may be from about 0.1 to about 1.0 microns, for example from about 0.2 to 0.4 microns and further for example from about 0.25 to about 0.3 microns. The Tg of the binders of the present invention may be from about −60 to about 100° C. for example, from about −30 to about 70° C. and further for example from about −15 to about 60° C. As used herein, the term "Tg" means polymer glass transition temperature. Techniques for measuring the glass transition temperature of polymers are known to those skilled in the art. One such technique is, for example, differential scanning calorimetry. A particularly useful means of estimating the glass transition temperature of a polymer is by calculation using the Fox Equation:

$$1/Tg_{(polymer)} = x_1 Tg_1 + x_2 Tg_2 + x_3 Tg_3 + \ldots + x_n Tg_n \quad (1)$$

where $x_1$ is the weight fraction of component i in the copolymer and $Tg_1$ is the homopolymer glass transition of component i. The homopolymer glass transition temperatures can be found in various publicly available sources. For example, the homopolymer glass transition temperatures for typical monomers are: vinyl acetate=−32° C., butyl acrylate=−54° C., and vinyl neodecanoate=−3° C. and 2-ethylhexyl acrylate=−65° C.

The viscosity of the binders of the present invention may be from about 20 to about 3000 and for example from about 50 to about 1500 centipoise ("cP") measured with a 40 to 60 weight percent solids composition using a Brookfield Viscometer with a number 2 spindle at 60 revolutions per minute. The molecular weight of the binders of the present invention is typically from about $10^4$ to $10^7$, for example from about 200,000 to 1,000,000 grams per gram mole. As used herein, the term "molecular weight" means weight average molecular weight. Techniques for altering molecular weight are well known and include, for example, utilizing multi functional monomers and chain transfer agents. Techniques for measuring the weight average molecular weight of latex polymers is known to those skilled in the art. One such technique is, for example, gel permeation chromatography.

The binder polymer of the present invention may contain hydrophobic groups. The monoethylenically unsaturated monomers described above can be polymerized with one or more macromonomers which are polymerizable. Such macromonomers may comprise a hydrophobic portion and an alkoxylated portion which is polymerizable with the other monomers. U.S. Pat. No. 4,703,080, incorporated herein by reference, describes hydrophobic binder resins. Exemplary macromonomers include urethane monomers which comprise the reaction product of a monohydric surfactant and a monoethylenically unsaturated isocyanate. These macromonomers are described in detail below with respect to the dispersant.

In one aspect of the present invention, the binder polymer comprises an acid functional latex. Specific acid functional monomers suitable for use in accordance with the present invention include, for example, acrylic acid, methacrylic acid, and maleic acid.

Preparation of latex compositions is well known in the paint and coatings art. Any of the well known free-radical emulsion polymerization techniques used to formulate latex polymers can be used in the present invention. Such procedures include, for example, single feed, core-shell, and inverted core-shell procedures which produce homogeneous or structures particles.

In one useful embodiment a vinyl acrylate binder resin comprises about 40 to about 60% by weight of a fatty acid vinyl ester, about 30 to about 50% by weight of methylmethacrylate, about 0.5 to about 10% by weight of diacetone acrylamide and about 0.5 to about 5% by weight methacrylic acid, based on the total weight of the polymer.

In another useful embodiment, an acrylic binder resin comprises about 20 to about 35% by weight butyl acrylate, about 40 to about 65% by weight methyl methacrylate, about 0.5 to about 10% by weight diacetone acrylamide, about 0.5 to about 5% by weight methacrylic acid and about 5 to about 10% by weight acrylonitrile, based on the total weight of the polymer.

Dispersants

Dispersants suitable for use in accordance with the present invention may comprise the reaction product of an unsaturated carboxylic acid monomer, a monoethylenically unsaturated monomer different from the carboxylic acid monomer, a macromonomer comprising a hydrophobic portion and an alkoxylated portion which is polymerizable with the other monomers, and a monomer having latent crosslinking functionality.

The unsaturated carboxylic acid monomers suitable for use in accordance with the present invention include α,β-monethylenically unsaturated carboxylic acids. Carboxylic acid monomers may be selected from the group consisting of acrylic acid, methacrylic acid, crotonic acid, itaconic acid, maleic acid, and mixtures thereof. The concentration of the carboxylic acid monomer is typically from about 20 to about 70 weight percent, for example, from about 20 to about 50 weight percent and further for example, from about 35 to about 45 weight percent based on the total weight of the polymer. In one embodiment, the amount of the carboxylic acid monomer is sufficient to provide a polymeric structure, which will solubilize and provide viscosity enhancement when reacted with an alkali such as for example, sodium hydroxide.

In accordance with one embodiment of the present invention, the monoethylenically unsaturated monomer different from the carboxylic acid monomer may comprise a methyl group. As one example, this monomer may be an acrylate. As another example, this monomer may be ethyl acrylate. The amount of the monoethylenically unsaturated monomer different from carboxylic acid may be from about 5 to about 70 weight percent, for example from about 10 to about 50 weight percent based on the total weight of the polymer.

Macromonomers suitable for manufacturing the dispersant in accordance with the present invention comprise a hydrophobic portion and an alkoxylated portion which is polymerizable with other monomer(s). As used herein, the term "macromonomer" means a polymerizable monomer which comprises the reaction product of two or more compounds. Such macromonomers include, for example, any alkoxylated, e.g., ethoxylated or propoxylated, monomers having ethylenic unsaturation and which are terminated by a hydrophobic fatty chain. Examples of unsaturated, polymerizable moieties include those selected from the group consisting of vinyl group containing moieties, methacryloyl, maleoyl, itaconoyl, crotonyl, an unsaturated urethane moiety, hemiester maleoyl, hemiester itaconoyl, $CH_2=CHCH_2—O—$, methacrylamido and substituted methacrylamido. Examples of hydrophobic moieties include those selected from the group consisting of alkyl, alkaryl, i.e., alkylaryl or aralkyl, or aryl, linear or branched, saturated or unsaturated, and having at least 6 carbon atoms, for example from about 6 to 30 carbon atoms per molecule.

Useful macromonomers include urethane monomers which comprise the reaction product of a monohydric surfactant and a monoethylenically unsaturated isocyanate. For instance, the urethane monomer may be a nonionic, urethane monomer which is the urethane reaction product of a monohydric, nonionic surfactant with a monoethylenically unsaturated monoisocyanate, and may be one lacking ester groups, e.g., alpha, alpha-dimethyl-m-isopropenyl benzyl isocyanate. Monohydric nonionic surfactants are themselves well known and are usually alkoxylated, e.g., ethoxylated, hydrophobes containing adducted ethylene oxide to provide the hydrophilic portion of the molecule. The hydrophobes are usually aliphatic alcohols or alkyl phenols in which a carbon chain containing at least 6 carbon atoms, for example about 6 to 30 carbon atoms, provides the hydrophobic portion of the surfactant. These surfactants are illustrated by ethylene oxide adducts of dodecyl alcohol or octyl or nonyl phenol which are available in commerce and which contain about 5 to about 150, for example about 25 to about 60 moles of ethylene oxide per mole of hydrophobe. Other hydrophobic substituents, such as complex hydrophobes, disclosed for example in U.S. Pat. No. 5,488,180, are suitable for use in accordance with the present invention.

Monoethylenically unsaturated isocyanates suitable for use in preparing the urethane monomers may be any isocyanates effective to form the desired urethane linkage. For example, the isocyanate may be a monoethylenically unsaturated monoisocyanate. Any copolymerizable unsaturation may be employed, such as acrylate and methacrylate unsaturation. One may also use allylic unsaturation, as provided by allyl alcohol. These, such as in the form of a hydroxy-functional derivative, as is obtained by reacting a C2-C4 monoepoxide, like ethylene oxide, propylene oxide or butylene oxide, with acrylic or methacrylic acid to form an hydroxy ester, may be reacted in equimolar proportions with an organic diisocyanate, such as toluene diisocyanate or isophorone diisocyanate. One useful monoethylenic monoisocyanate is styryl, as in alpha, alpha-dimethyl-m-isopropenyl benzyl isocyanate, and this unsaturated monoisocyanate lacks the ester group so it forms urethanes which lack this group. The amount of the monoethylenically unsaturated isocyanate relative to the monohydric surfactant used in making the macromonomer, (on a mole ratio basis) is typically from about 0.1-2.0 to 1, for example about 1.0 to 1.0.

Suitable macromonomers useful in this invention can also be represented by the formula:

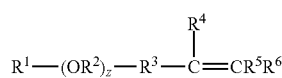

wherein:
$R^1$ is a monovalent residue of a substituted or unsubstituted hydrophobe compound; each $R^2$ is the same or different and is a substituted or unsubstituted divalent hydrocarbon residue; $R^3$ is a substituted or unsubstituted divalent hydrocarbon residue; $R^4$, $R^5$, $R^6$ are the same or different and are hydrogen or a substituted or unsubstituted monovalent hydrocarbon residue; and z is a value of 0 to 150.

Illustrative $R^1$ substituents include, for example, simple or complex hydrophobe containing from 1 to 30 carbon atoms such as alkyl, aryl, aralkyl, alkaryl and cycloakyl groups.

Illustrative $R^3$ substituents include, for example, the organic residue of ethers, esters, urethanes, amides, ureas, anhydrides and the like including mixtures thereof. The $R^3$ substituent can be generally described as a "linkage" between the hydrophobe bearing surfactant or alcohol and the unsaturated portion of the macromonomer compound.

The oxyalkylene moieties included in the macromonomer compounds may be homopolymers or block or random copolymers of straight or branched alkylene oxides. Mixtures of alkylene oxides such as ethylene oxide and propylene oxides may also be employed.

Further details concerning the preparation of such macromonomers are known to those skilled in the art and are disclosed, for example, in U.S. Pat. Nos. 4,514,552, 4,801,671, 5,292,828, 5,292,843 and 5,294,693, incorporated herein by reference.

Typically, the amount of the macromonomer is from about 0.5 to about 60 weight percent, for example, from about 5 to about 50 weight percent and further for example, from about 35 to about 45 weight percent based on the total weight of the dispersant polymer. In one useful embodiment, the molecular weight of the macromonomer ranges from about 400 to about 8000 grams per gram mole.

The viscosity of the dispersants of the present invention may be from about 5 to about 1500 cP in the un-neutralized form measured at 20° C. with a 20 to 50 weight percent solids composition using a Brookfield Viscometer with a number 2 spindle at 60 revolutions per minute. The molecular weight of the dispersants of the present invention is typically from about $10^3$ to about $10^6$, for example, from about 5,000 to about 10,000 grams per gram mole. The particle size of the dispersant may be from about 0.05 to about 1.0 microns, for example, from about 0.1 to about 0.4 microns and further for example, from about 0.1 to about 0.3 microns. The Tg of the dispersants of the present invention may be from about 0 to about 90° C., for example, from about 5 to about 60° C. and further for example from about 15 to about 35° C.

Dispersants useful in the present invention contain about 0.5 to about 50% by weight, for example, about 20 to about 35% by weight, based on the total weight of the dispersant polymer, of at least one monomer having latent crosslinking functionality, such as those monomers having latent crosslinking functionality described above with respect to the binder.

Thickeners

Any suitable alkali soluble thickeners may be utilized in accordance with the present invention. Such alkali soluble thickeners are disclosed, for example, in U.S. Pat. Nos. 4,514,552, 4,722,962, 5,292,828 and 5,292,843, which are incorporated herein by reference. Useful alkali soluble thickeners may comprise the aqueous emulsion reaction product of an unsaturated carboxylic acid monomer, e.g., methacrylic acid; a monoethylenically unsaturated monomer different from the carboxylic acid monomer, e.g. ethyl acrylate; a macromonomer comprising a hydrophobic portion and an alkoxylated portion which is polymerizable with the other monomers; and a monomer having latent crosslinking functionality. The unsaturated carboxylic acid monomer, monoethylenically unsaturated monomer different from the carboxylic acid monomer, macromonomer and latent crosslinking monomer used to polymerize the thickener can include those such as described above with reference to the binder polymer and dispersant. Often, the macromonomer is a urethane monomer which is the urethane reaction product of a monohydric surfactant and a monoethylenically unsaturated monoisocyanate. Typically, the monohydric surfactant comprises an ethyloxated or propoxylated aliphatic alcohol or alkyl phenol.

In one useful embodiment of the present invention, the thickeners are prepared using monomers such as those described above with respect to the dispersants. The amount of the macromonomer may be from about 1 to about 20 weight percent, for example from about 5 to about 15 weight percent based on the total weight of the polymer.

The viscosity of the thickeners of the present invention may be from about 5 to about 1500 cP in the un-neutralized form measured at 20° C. with a 20 to 50 weight percent solids composition using a Brookfield Viscometer with a number 2 spindle at 60 revolutions per minute. The molecular weight of the thickeners of the present invention may be from about $10^4$ to about $10^7$, for example, from about 20,000 to about 200,000 grams per gram mole. The particle size of the thickeners may be from about 0.05 to about 1.0 microns, for example, from about 0.1 to about 0.4 microns and further for example, from about 0.1 to about 0.3 microns. The Tg of the thickeners of the present invention may be from about 0 to about 90° C., for example from about 5 to about 60° C., and further for example from about 15 to about 55° C.

Thickeners useful in the present invention may contain about 0.5 to about 35% by weight, for example about 1 to about 5% by weight, based on the total weight of the thickener polymer, of at least one monomer having latent crosslinking functionality.

Reactive Diluent

Reactive diluents suitable for use in accordance with the present invention comprise the reaction product of an unsaturated carboxylic acid monomer, a monoethylenically unsaturated monomer different from the carboxylic acid monomer, a monomer having latent crosslinking functionality, and a chain transfer agent.

The unsaturated carboxylic acid monomers suitable for use in the reactive diluent include those discussed as being useful for the preparation of the dispersant herein. For example, useful carboxylic acid monomers include, but are not limited to acrylic acid, methacrylic acid, crotonic acid, itaconic acid, maleic acid, and mixtures thereof. The concentration of the carboxylic acid monomer may be from about 1 to about 20 weight percent, for example, about 7 to about 15%, further for example, about 10% by weight based on the total weight of the polymer. In one embodiment, the lowest amount of carboxylic acid monomer is used such that the polymer will remain in solution.

In accordance with the present invention, the monoethylenically unsaturated monomer different from the carboxylic acid monomer may comprise a methyl group. For example, an acrylate monomer, such as ethyl acrylate may be used. The amount of the monoethylenically unsaturated monomer may comprise about 5 to about 90 weight percent, for example, about 20 to about 70 weight percent based on the total weight of the polymer.

The reactive diluent of the present invention also comprises about 0.5 to about 50% by weight, for example about 20% to about 35% by weight, further for example about 20%, based on the total weight of the polymer of at least one monomer having latent crosslinking functionality, such as the monomers having latent crosslinking capabilities as described with respect to the binder herein.

In one embodiment of the present invention, the reactive diluent is included in the pigment grind portion of a paint. It has been observed that pigment grinds including the reactive diluent of the present invention are able to be recovered more easily with the addition of water. Pigment grind pastes of the present invention include pigment, solvent, and the reactive diluent made in accordance of the present invention. Other optional ingredients include dispersants (such as the dispersant described herein) and surfactants. The reactive diluent may also be post added to a prepared latex paint composition. In one useful embodiment, the addition of the reactive diluent occurs before the pigments in the grind. A typical ratio of reactive diluent to pigment (e.g. titanium dioxide) is about 1:43 to about 1:23 parts by weight.

Binders, dispersants, thickeners, and reactive diluents of the present invention may be in colloidal form, i.e., aqueous dispersions, or in solution and can be prepared by emulsion polymerization in the presence of a chain transfer agent and an initiator. Specific details concerning procedures and conditions for emulsion polymerization are known to those skilled in the art. The polymerization may be carried out in an aqueous medium at a temperature of from about 35 to 90° C. The pressure is not critical and is dependent upon the nature of the monomers employed as can be determined by one skilled in the art.

A chain transfer agent optionally may be present during polymerization reactions at a concentration of from about 0.01 to about 5 weight percent, for example, from about 0.1 to about 2 weight percent based on the total monomer content. Both water-insoluble and water-soluble chain transfer agents can be employed. Illustrative of substantially water-soluble chain transfer agents are alkyl and aryl mercaptans such as butyl mercaptan, mercaptoacetic acid, mercaptoethanol, 3-mercaptol-1,2-propanediol and 2-methyl-2-propanethiol. Substantially water-insoluble chain transfer agents include, for example, t-dodecyl mercaptan, phenyl mercaptan, pentaerythritol tetramercaptopropionate, octyldecyl mercaptan, tetradecyl mercaptan and 2-ethylhexyl-3-mercaptopropionate. In the case of the reactive diluent, a chain transfer agent is used to control the molecular weight of the resulting polymer. The molecular weight of the reactive diluent of the present invention is typically from about $10^3$ to about $10^6$, for example, from about 5,000 to about 10,000 grams per gram mole.

In carrying out the emulsion polymerization, an initiator (also referred to in the art as a catalyst) may be used at a concentration sufficient to catalyze the polymerization reaction. This will typically vary from about 0.01 to about 3 weight percent based on the weight of monomers charged. However, the concentration of initiator may be from about 0.05 to about 2 weight percent and, for example, from about 0.1 to about 1 weight percent of the monomers charged. The particular concentration used in any instance will depend upon the specific monomer mixture undergoing reaction and the specific initiator employed, which details are known to those skilled in the art. Illustrative of suitable initiators include hydrogen peroxide, peracetic acid, t-butyl hydroperoxide, di-t-butyl hydroperoxide, dibenzoyl peroxide, benzoyl hydroperoxide, 2,4-dicholorbenzoyl peroxide, 2,5-dimethyl-2,5-bis(hydroperoxy) hexane, perbenzoic acid, t-butyl peroxypivalate, t-butyl peracetate, dilauroyl peroxide, dicaployl peroxide, distearoyl peroxide, dibenzoyl peroxide, diisopropyl peroxydicarbonate, didecyl peroxydicarbonate, dicicosyl peroxydicarbonate, di-t-butyl perbenzoate, 2,2'-azobis-2,4-dimethylvaleronitrile, ammonium persulfate, potassium persulfate, sodium persulfate, sodium perphosphate, azobisisobutyronitrile, as well as any of the other known initiators. Also useful are the redox catalyst systems such as sodium persulfate-sodium formaldehyde sulfoxylate, cumene hydroperoxide-sodium metabisulfite, hydrogen peroxide-ascorbic acid, and other known redox systems. Moreover, as known by those skilled in the art, traces of metal ions can be added as activators to improve the rate of polymerization, if desired.

The particular surfactant useful for conducting the polymerization reaction is not critical to the present invention. Typical surfactants include anionic surfactants such as sodium lauryl sulfate, sodium tridecylether sulfate, diester sulfosuccinates and sodium salts of alkyl aryl polyether sulfonates; and nonionic surfactants such as alkyl aryl polyether alcohols and ethylene oxide condensates of propylene oxide, propylene glycol adducts.

The reaction products of the polymerizations comprising the binders, dispersants, thickeners, or reactive diluents of the present invention typically have a solids, i.e., polymer, content of from about 15 to about 65 weight percent, for example from about 20 to about 65 weight percent and further for example, from about 25 to about 60 weight percent based on the weight of the latex and water.

Similar coating compositions which omit the reactive diluent described herein are taught in U.S. Pat. No. 6,869,996, which is incorporated herein by reference. The reactive diluent described herein may be incorporated into the grind phase of paints as described in the '996 patent or may be post added to finished paint products as described therein.

EXAMPLES

Example M1

Preparation of Macromonomer with Small Hydrophobe

To a one-liter glass reactor fitted with a thermometer, heating mantle, thermoregulator, stirrer, nitrogen sparge, and condenser including a Dean-Stark trap 930 grams of a 40 mole ethoxylate of nonyl phenol, i.e., a small hydrophobe, may be charged. The reactor contents may be heated, with nitrogen sparging, to 110EC and may be held for two hours while trace moisture is removed and collected in the Dean-Stark Trap (typically less than 1 g). The reactor contents may then be cooled to 80° C., the Dean Stark trap replaced with a condenser, and the nitrogen sparge switched to an air sparge for 15 minutes. With continued air sparging, 0.02 g methoxyhydroquinone inhibitor, 0.50 g dibutyl tin dilaurate catalyst, and 99.7 g of alpha, alpha-dimethyl-m-isopropenyl benzyl isocyanate (m-TMI, a product of CYTEC, Stamford, Conn.) may be charged in order to the reactor. After a rapid initial exotherm which may increase the reaction temperature about 8° C., the contents may be maintained at 80° C. for an additional two hours. The product may then be cooled to room temperature. The final product should be a white wax in appearance with residual isocyanate content of about 0.5% and with about 98% of the original ethylenic unsaturation retained.

Example M2

Preparation of Macromonomer with Large Hydrophobe

A macromonomer may be prepared substantially in accordance with Example M1, except that a 20 mole ethoxylate of bis-nonylphenoxy ethanol (large hydrophobe) may be used in place of the nonylphenol (small hydrophobe) and the amounts of the reactants used may be adjusted to maintain a molar ration of 1:1.

Example A

Acrylic Latex Binder Preparation

A monomer mixture may be prepared by charging 460 g of butyl acrylate, 520 g of methyl methacrylate, 9.8 g diacetone acrylamide (DAAM), 5.4 g of methacrylic acid, 40 g of Rhodacal DS-4 (a dodecyl benzene sulfonate surfactant available from CYTEC) and 365 g of water to a two liter monomer feed cylinder. A two liter jacketed resin flask equipped with a four-bladed stainless steel mechanical stirrer, Claisen connecting tube, Friedrichs water condenser, nitrogen sparge and bubble trap, thermometer, and monomer addition inlets may be used to charge 560 g of water. An initial oxidizer solution, prepared by dissolving 4 g of ammonium persulfate in 20 g of water, may be prepared in a separate container. Under nitrogen purge, the reactor may be heated to 80° C. by circulating temperature controlled water through the reactor jacket. After the temperature of the reactor charge reaches about 80° C., the initial oxidizer solution may be added to the reactor. Two minutes later, the monomer feed may be conveyed to the reaction vessel over a 3 hour period by FMI (Fluid Metering Inc.) pumps using ⅛ inch Teflon tubing with continuous stirring while the reaction temperature is held between 79° and 81° C. The reaction may be allowed to proceed at 80° C. for an additional hour after completion of the monomer feed. To the product may be added 15% ammonium hydroxide solution to a pH of 9. To the cooled product 36.8 g of a 10% solution of adipic dihydrazide may be added.

Example B

Styrene Acrylic Latex Binder Preparation

A first monomer mixture may be prepared by charging 365 grams of butyl acrylate (BA), 470 grams of methyl methacrylate (MMA), 130 grams of styrene, 5.4 grams of methacrylic acid (MAA), 40 grams of diacetone acrylamide (DAAM), 40 grams of TRITON GR-9M (a disodium ethoxylated lauryl alcohol half ester of sulfosuccinic acid surfactant available from Union Carbide Corporation, Danbury, Conn.) and 450 grams of water to a 2-liter monomer feed cylinder. A two liter jacketed resin flask equipped with a four-blade stainless steel mechanical stirrer, Claisen connecting tube, Friedrichs water condenser, nitrogen sparge and bubble trap, thermometer, and monomer addition inlets may be used as the reactor. To the reactor may be charged 600 grams of water. An initial oxidizer solution, prepared by dissolving 4 grams of ammonium persulfate in 20 grams of water, may be prepared in a separate container. Under nitrogen purge, the reactor may be heated to 80° C. by circulating temperature controlled water through the reactor jacket. After the temperature of the reactor charge reaches 80° C., the initial oxidizer solution may be added to the reactor. Two minutes later, the monomer feed may be conveyed to the reaction vessel over a 3 hour period by FMI (Fluid Metering Inc.) pumps using ⅛ inch Teflon tubing with continuous stirring while the reaction temperature is held between 79° C. and 81° C. The reaction may be allowed to proceed at 80° C. for an additional hour after completion of the monomer feed.

A second monomer mixture may be prepared by charging 36 grams of methacrylic acid (MAA), 72 grams of methyl methacrylate, 120 grams of styrene, 12.5 grams diacetone acrylamide, 1.2 grams of ethylhexyl-3-mercaptopropionate as a chain transfer agent (CTA), 12.5 grams of a macromonomer, such as the one illustrated in Example M1 and 12.5 grams of the macromonomer alpha, alpha-dimethyl-m-isopropenylbenzylisocyanate adduct with Bis-nonylphenoxypropylpoly(ethyleneoxy) ethanol (large hydrophobe macromonomer of Example M2), 4 grams of Rhodacal DS-4 and 245 grams of water to a one 2-liter monomer feed cylinder. An additional 4 grams of ammonium persulfate in 20 grams of water, may be prepared in a separate container and added to the reactor. The monomer feed may be conveyed to the reaction vessel over a 3 hour period with continuous stirring while the reaction temperature may be held between 79° C. and 81° C. The reaction may be allowed to proceed at 80° C. for an additional hour after completion of the monomer feed.

To the product 15% ammonium hydroxide solution to a pH of 9 may be added. To the cooled product may be added 0.75 molar amounts of adipic dihydrazide.

Table 1 below sets forth a variety of latexes which may be made with the monomers as listed in accordance with the procedure of Example B. Ingredients are listed in grams.

TABLE 1

| Example | 1st Stage DAAM | 2nd Stage M1 | 2nd Stage M2 | 2nd Stage DAAM | 2nd Stage MAA | CTA |
|---|---|---|---|---|---|---|
| B1 | 40 | 0 | 0 | 12.5 | 30 | 0 |
| B2 | 15 | 0 | 12.5 | 5 | 36 | 1.2 |
| B3 | 40 | 12.5 | 0 | 12.5 | 36 | 0 |
| B4 | 15 | 12.5 | 12.5 | 5 | 36 | 0 |
| B5 | 15 | 12.5 | 12.5 | 5 | 30 | 1.2 |
| B6 | 15 | 12.5 | 0 | 5 | 36 | 1.2 |
| B7 | 40 | 0 | 0 | 12.5 | 36 | 1.2 |
| B8 | 40 | 12.5 | 0 | 12.5 | 30 | 1.2 |
| B9 | 15 | 12.5 | 0 | 5 | 30 | 0 |
| B10 | 40 | 12.5 | 12.5 | 12.5 | 30 | 0 |
| B11 | 15 | 0 | 12.5 | 5 | 30 | 0 |
| B12 | 15 | 0 | 0 | 5 | 36 | 0 |
| B13 | 15 | 0 | 0 | 5 | 30 | 1.2 |
| B14 | 40 | 0 | 12.5 | 12.5 | 30 | 1.2 |
| B15 | 40 | 12.5 | 12.5 | 12.5 | 36 | 1.2 |
| B16 | 40 | 0 | 12.5 | 12.5 | 36 | 0 |
| B17 | 100 | 0 | 0 | 25 | 48 | 1.2 |
| B18 | 50 | 0 | 5 | 12.5 | 48 | 1.2 |
| B19 | 100 | 0 | 5 | 25 | 36 | 1.2 |
| B20 | 50 | 0 | 0 | 12.5 | 36 | 1.2 |
| B21 | 50 | 0 | 5 | 12.5 | 36 | 1.2 |
| B22 | 100 | 0 | 0 | 25 | 36 | 1.2 |
| B23 | 100 | 0 | 5 | 25 | 48 | 1.2 |
| B24 | 50 | 0 | 0 | 12.5 | 48 | 1.2 |
| B25[1] | 50 | 0 | 0 | 12.5 | 15 | 1.2 |
| B26[1] | 50 | 0 | 0 | 12.5 | 15 | 1.2 |
| B27[2] | 50 | 0 | 0 | 12.5 | 15 | 1.2 |
| B28[2]* | 50 | 0 | 0 | 12.5 | 15 | 1.2 |
| B29[3]* | 50 | 0 | 0 | 12.5 | 15 | 1.2 |

[1]Methylmethacrylate substituted for styrene monomer in stage 1 and stage 2.
[2]VeoVa10 substituted for BA and styrene in stage 1 and stage 2.
[3]MMA substituted for styrene and acrylonitrile substituted for 10% by weight of MMA in stage 1 and stage 2.
*Surfactant used was Rhodafac RE-610

Example C

Latex Binder Preparation

A monomer mixture may be prepared by charging 615 grams of VeoVa 10 (a vinyl versatate ester having 10 carbon atoms in the acid portion, commercially available from Shell Chemical), 368 grams of methacrylate (MMA), 9.8 grams diacetone acrylamide (DAAM), 11 grams of methacrylic acid (MAA), 40 grams of Rhodafac 610 (a nonylphenol ethoxylated phosphate ester surfactant available from Rhodia) and 365 grams of water to a 2-liter monomer feed cylinder. A two liter jacketed resin flask equipped with a four-bladed stainless steel mechanical stirrer, Claisen connecting tube, Freidrichs water condenser, nitrogen sparge and bubble trap, thermometer, and monomer addition inlets may be used as the reactor. To the reactor was charged 560 grams of water. An initial oxidizer solution, prepared by dissolving 4 grams of ammonium persulfate in 20 grams of water, may be prepared in a separate container. Under nitrogen purge, the reactor was heated to 80° C. by circulating temperature controlled water through the reactor jacket. After the temperature of the reactor charge reaches 80° C., the initial oxidizer solution may be added to the reactor. Two minutes later, the monomer feed may be conveyed to the reaction vessel over a 3 hour period by FMI pumps using ⅛" Teflon tubing with continuous stirring while the reaction temperature is held between 79° C. and 81° C. The reaction may be allowed to proceed at 80° C. for an additional hour after completion of the monomer feed. To the product may be added 15% ammonium hydroxide solution to a pH of 9. To the cooled product 0.75 molar amounts of adipic dihydrazide may be added.

Table 2 below sets forth other latexes, which may be made with monomers as listed in accordance with the procedure of Example C. Ingredients are listed in grams.

TABLE 2

| Example | VeoVa10 | MMA | MAA | Surfactant |
|---|---|---|---|---|
| C1 | 615 | 368 | 11 | Rhodafac RE-610 |
| C2 | 487 | 497 | 11 | Rhodafac RE-610 |

Example D

Acrylic Latex Binder Preparation

A monomer mixture may be prepared by charging 530 grams ("g") of butyl acrylate, 600 g of methyl methacrylate, 23 g diacetone acrylamide (DAAM), 5.4 g of methacrylic acid (MAA), 40 g of Rhodacal DS-4 (a surfactant available from Rhone-Poulenc) and 450 g of water to a one 2-liter monomer feed cylinder. A two liter jacketed resin flask equipped with a four-bladed stainless steel mechanical stirrer, Claisen connecting tube, Friedrichs water condenser, nitrogen sparge and bubble trap, thermometer, and monomer addition inlets may be used to charge 800 g of water. An initial oxidizer solution, prepared by dissolving 4 g of ammonium persulfate in 20 g of water, may be prepared in a separate container. Under nitrogen purge, the reactor may be heated to 80° C. by circulating temperature controlled water through the reactor jacket. After the temperature of the reactor charge reaches 80° C., the initial oxidizer solution may be added to the reactor. Two minutes later, the monomer feed may be conveyed to the reaction vessel over a 3 hour period by FMI (Fluid Metering Inc.) pumps using ⅛" Teflon tubing with continuous stirring while the reaction temperature was held between 79 and 81° C. The reaction may proceed at 80° C. for an additional hour after completion of the monomer feed.

A second monomer mixture may be prepared by charging 7.35 grams of methacrylic acid (MAA), 21 grams of butyl acrylate, 7.5 grams diacetone acrylamide (DAAM), 7.35 grams of a macromonomer (e.g. M1), 4 grams of Rhodacal DS-4 and 10 grams of ammonium persulfate in 20 grams of water in a separate container and the mixture then added to the reactor. The monomer feed may be conveyed to the reaction vessel over a 3 hour period with continuous stirring while the reaction temperature is held between 79 and 81° C. The reaction may be allowed to proceed at 80° C. for an additional hour after completion of the monomer feed.

To the product may be added 15% ammonium hydroxide solution to a pH of 9. To the cooled product may be added 0.75 molar amounts of adipic dihydrazide.

Table 3 sets forth a variety of latexes, which may be made with the monomers as listed in accordance with the procedure of Example D. Ingredients are listed in grams.

TABLE 3

| Example | 1st Stage DAAM | 2nd Stage M1 | 2nd Stage DAAM | 2nd Stage MAA |
|---|---|---|---|---|
| D1 | 23 | 7.35 | 7.3 | 7.5 |
| D2 | 58 | 1.8 | 1.8 | 15 |
| D3 | 58 | 7.35 | 1.8 | 15 |
| D4 | 23 | 1.8 | 7.3 | 7.5 |
| D5 | 23 | 7.35 | 7.3 | 15 |
| D6 | 58 | 1.8 | 1.8 | 7.5 |
| D7 | 23 | 1.8 | 7.3 | 15 |
| D8 | 58 | 7.35 | 1.8 | 7.5 |

Example E

Preparation of Crosslinkable Thickener

A monomer mixture (300 grams) may be prepared by charging ethyl acrylate, methacrylic acid, diacetone acrylamide, macromonomer (e.g. M1), 13 grams of a 75% solution of Aerosol[7] OT surfactant (American Cyanamid) and 3 grams of distilled deionized water to a bottle, and dispersing the contents with vigorous shaking. The ethyl acrylate, methacrylic acid, diacetone acrylamide and macromonomer (e.g. M1) may be added in amounts identified in Table 4 below. A catalyst feed mixture comprised of 0.53 grams of sodium persulfate and 52.47 grams of water may be prepared in another container. To a 2 liter resin flask immersed in a thermostated water bath and equipped with a 4-bladed stainless steel mechanical stirrer, Claisen connecting tube, water condenser, nitrogen sparge and bubble trap, thermometer and monomer and catalyst addition inlets, 1.20 grams of the sodium salt of vinyl sulfonic acid and 658.5 grams of water may be charged. The monomer mixture may be charged to a 1-liter graduated monomer feed cylinder, and the catalyst solution may be charged to a 125 milliliter graduated catalyst feed cylinder. Under nitrogen purge, the reactor may be heated to 70° C., whereupon 33 milliliters of the monomer mixture and 3 milliliters of the catalyst feed mixture may be charged to the reaction vessel. The reaction vessel was subsequently heated to 80° C. After allowing the monomers to react for 20 minutes to form a seed product, the monomer and catalyst feed mixtures may be conveyed to the reaction vessel by FMI pumps via ⅛ inch teflon tubing at a rate of 1.94 and 0.27 milliters/minute, respectively, under continuous stirring while holding the reaction temperature between 76 and 82° C. The reaction may be allowed to proceed for another hour, after which the product may be cooled and filtered with a 200 mesh nylon cloth. The coagulum may be collected from the reaction vessel and filter cloth. The product should be a low viscosity latex of solids content of about 40% and pH of about 2.5.

Table 4 sets forth a variety of thickeners, which may be made with the monomers as listed, in accordance with the procedure of Example E. Ingredients are listed in percentages by weight based on the total weight of the polymer.

TABLE 4

| Example | M1 | M2 | MAA | EA | DAAM | Surfactant |
|---|---|---|---|---|---|---|
| E1 | 15 | | 40 | 35 | 10 | Rhodafac RE-610 |
| E2 | 5 | | 40 | 45 | 10 | Rhodafac RE-610 |
| E3 | 15 | | 40 | 40 | 5 | Rhodafac RE-610 |
| E4 | 5 | | 40 | 50 | 5 | Triton GR-9M |
| E5 | | 5 | 40 | 50 | 5 | Triton GR-9M |
| E6 | | 5 | 40 | 45 | 10 | Triton GR-9M |
| E7 | 15 | | 40 | 35 | 10 | Triton GR-9M |
| E8 | 15 | | 40 | 40 | 5 | Triton GR-9M |

Example F

Preparation of Crosslinkable Dispersant

A monomer mixture (300 grams) may be prepared by charging ethyl acrylate, methacrylic acid, diacetone acrylamide, macromonomer (e.g. M1), 13 grams of a 75% solution of Aerosol[7] OT surfactant (American Cyanamid) and 3 grams of distilled deionized water to a bottle, and dispersing the contents with vigorous shaking. The ethyl acrylate, methacrylic acid, diacetone acrylamide and macromonomer may be added in amounts identified in Table 5 below. A catalyst feed mixture comprised of 0.53 grams of sodium persulfate and 52.47 grams of water may be prepared in another container. To a 2 liter resin flask immersed in a thermostated water bath and equipped with a 4-beaded stainless steel mechanical stirrer, Claisen connecting tube, water condenser, nitrogen sparge and bubble trap, thermometer and monomer and catalyst addition inlets, 1.20 grams of the sodium salt of vinyl sulfonic acid and 658.5 grams of water may be charged. The monomer mixture may be charged to a 1-liter graduated monomer feed cylinder, and the catalyst solution may be charged to a 125 milliliter graduated catalyst feed cylinder. Under nitrogen purge, the reactor may be heated to 70° C., whereupon 33 milliliters of the monomer mixture and 3 milliliters of the catalyst feed mixture may be charged to the reaction vessel. The reaction vessel may subsequently be heated to 80° C. After allowing the monomers to react for 20 minutes to form a seed product, the monomer and catalyst feed mixtures may be conveyed to the reaction vessel by FMI pumps via ⅛ inch teflon tubing at a rate of 1.94 and 0.27 milliters/minute, respectively, under continuous stirring at a reaction temperature held between 76 and 82° C. The reaction may proceed for another hour, after which the product may be cooled and filtered with a 200 mesh nylon cloth. The coagulum should be collected from the reaction vessel and filter cloth. The product should be a low viscosity latex of solids content of about 25%. The product may then be neutralized to a pH of about 9.0.

Table 5 sets forth a variety of dispersants, which may be made with the monomers as listed, in accordance with the procedure of Example F. Ingredients are listed in percentages by weight based on the total weight of the polymer.

TABLE 5

| Example | M1 | M2 | MAA | EA | DAAM | Surfactant |
|---------|------|------|------|------|------|----------------|
| F1      |      |      | 17.5 | 32.5 | 20   | Rhodafac RE-610 |
| F2      |      | 30   | 17.5 | 47.5 | 5    | Triton GR-9M   |
| F3      | 30   |      | 17.5 | 17.5 | 35   | Triton GR-9M   |
| F4      | 30   |      | 17.5 | 32.5 | 20   | Triton GR-9M   |
| F5      | 37.5 |      | 17.5 | 25   | 20   | Rhodafac RE-610 |
| F6      | 37.5 |      | 17.5 | 10   | 35   | Triton GR-9M   |
| F7      | 45   |      | 17.5 | 32.5 | 5    | Triton GR-9M   |
| F8      |      | 37.5 | 17.5 | 40   | 5    | Triton GR-9M   |
| F9      |      | 37.5 | 17.5 | 25   | 20   | Triton GR-9M   |
| F10     |      | 45   | 17.5 | 17.5 | 20   | Triton GR-9M   |
| F11     |      | 45   | 17.7 | 2.5  | 35   | Triton GR-9M   |
| F12     | 30   |      | 25   | 35   | 10   | Triton GR-9M   |
| F13     | 30   |      | 25   | 25   | 20   | Triton GR-9M   |
| F14     | 30   |      | 40   | 20   | 10   | Triton GR-9M   |
| F15     | 30   |      | 25   | 40   | 5    | Triton GR-9M   |
| F16     | 30   |      | 17.5 | 25   | 5    | Triton GR-9M   |

The binders, thickeners and dispersants described above were used in the formulation of paints as described below. The paint formulations may, in addition to the polymers described herein, contain conventional additives, such as pigments, fillers, wetting agents, coalescants, biocides and antifoaming agents and the like.

Example G

Preparation of Latex Paint

A pigment grind may prepared by adding the following ingredients in sequence: 54.96 grams of water, 5.92 grams of a 28% aqueous ammonia solution and 2.76 grams of a dispersant, such as Dispersant Example F9, to a HSD-type grinding apparatus with low agitation. A reactive diluent comprising the reaction product of 10% by weight methacrylic acid, 20% by weight diacetone acrylamide, 2% by weight chain transfer agent, and 68% ethyl acrylate may be prepared separately to have a molecular weight of about 40,000 AMU. 6.38 g of such reactive diluent may be added to the grinding apparatus. Next, 200.8 grams of TiPure R-706 titanium dioxide pigment (DuPont) may be slowly added while the agitation is increased. The mixture may be ground for approximately 1 hour, or until a fineness of grind of 8 Hegman is obtained. The agitation may be reduced and 25.6 grams of ethylene glycol and 1.8 grams of BYK 035 defoamer may be added.

A thickener premix may be prepared by adding 10.32 grams of water to a mix tank and under agitation, adding 0.25 grams of Thickener E5 and 0.05 grams of 28% aqueous ammonia solution to the tank.

The paint may be prepared by adding 568.72 grams of a binder resin, such as Binder Resin C2, to the grind mixture under agitation. After this mixture is agitated for about 30 minutes, the following ingredients may be added in order: 21.64 grams of Exxate 1000 (Exxon), 5.44 grams of Arcosolve DPNB (dipropylene glycol n-butyl ether from Arco Chemicals) and 11.64 grams of Exxate 900 (oxononyl acetate from Exxon). The thickener premix may then be added under agitation. Flash X-150 flash rust inhibitor (Halox) in an amount of 2.6 grams may then be added, followed by 1.48 grams of Surfynol 104BC defoamer (Air Products) and 1.48 grams of Byk 307 (wetting agent from BYK-Chemie). Dispersant (e.g. F9) may then be added in an amount of 2.76 grams. The paint may then be mixed until it is homogeneous and may be reduced with 54.57 grams of water to the desired application viscosity.

While this invention has been described by a specific number of embodiments, other variations and modifications may be made without departing from the spirit and scope of the invention as set forth in the appended claims.

What is claimed is:

1. An aqueous coating composition comprising:
    (a) solvent;
    (b) a binder polymer emulsion comprising a binder polymer, wherein the binder polymer is polymerized from one or more copolymerizable monoethylenically unsaturated monomers containing latent crosslinking functionality, wherein at least one of said monoethylenically unsaturated monomers is a carbonyl-containing monomer selected from the group consisting of acrolein, methacrolein, diacetone acrylamide, diacetone methacrylamide and vinylaceto acetate, and wherein the emulsion further comprises a polyamine compound capable of reacting with the latent crosslinking functionality during film formation;
    (c) a second polymer polymerized from monomers comprising a monoethylenically unsaturated monomer containing latent crosslinking functionality and a macromonomer comprising a hydrophobic portion and an alkoxylated portion, wherein the amount of the monoethylenically unsaturated monomer containing latent crosslinking functionality is in a range that extends from greater than 5 weight percent to 50 weight percent, based on the total weight of the second polymer; and
    (d) a reactive diluent resin polymerized from monomers comprising a monoethyleically unsaturated monomer containing latent crosslinking functionality, at least one ethylenically unsaturated monomer having carboxylic acid functionality, wherein the ethylenically unsaturated monomer having carboxylic acid functionality is present at in an amount sufficient to keep the reactive diluent resin in solution.

2. The coating composition of claim 1 wherein the reactive diluent resin comprises about 1% to about 20% by weight of the at least one ethylenically unsaturated monomer having carboxylic acid functionality.

3. The coating composition of claim 1 wherein the reactive diluent resin comprises about 10% to about 15% of the at least one ethylenically unsaturated monomer having carboxylic acid functionality.

4. The coating composition of claim 1 wherein the reactive diluent resin comprise about 10% by weight of the at least one ethylenically unsaturated monomer having carboxylic acid functionality.

5. An aqueous coating composition comprising:
(a) solvent;
(b) a binder polymer emulsion comprising a binder polymer, wherein the binder polymer is polymerized from one or more copolymerizable monoethylenically unsaturated monomers containing latent crosslinking functionality, wherein at least one of said monoethylenically unsaturated monomers is a carbonyl-containing monomer selected from the group consisting of acrolein, methacrolein, diacetone acrylamide, diacetone methacrylamide and vinylaceto acetate, and wherein the emulsion further comprises a polyamine compound capable of reacting with the latent crosslinking functionality during film formation;
(c) a second polymer polymerized from monomers comprising a monoethylenically unsaturated monomer containing latent crosslinking functionality and a macromonomer comprising a hydrophobic portion and an alkoxylated portion, wherein the amount of the monoethylenically unsaturated monomer containing latent crosslinking functionality is in a range that extends from greater than 5 weight percent to 50 weight percent, based on the total weight of the second polymer; and
(d) a third polymer comprising the reaction product of:
  (i) an unsaturated carboxylic acid monomer in an amount sufficient to keep the third polymer in solution;
  (ii) a monoethylenically unsaturated monomer different from the carboxylic acid monomer;
  (iii) a monoethylenically unsaturated monomer containing latent crosslinking functionality.

6. An aqueous coating composition comprising:
(a) solvent;
(b) a first polymer emulsion comprising a polymer polymerized from one or more copolymerizable monoethylenically unsaturated monomers, wherein at least one of said monoethylenically unsaturated monomers is a carbonyl containing monomer selected from the group consisting of acrolein, methacrolein, diacetone acrylamide, diacetone methacrylamide and vinylaceto acetate, and wherein the emulsion further comprises a polyamine compound selected from the group consisting of oxalic dihydrazide, adipic dihydrizide, and sebacic dihydrazide;
(c) a second polymer comprising the reaction product of:
  (i) an unsaturated carboxylic acid monomer;
  (ii) a monoethylenicaly unsaturated monomer different from the carboxylic acid monomer,
  (iii) a macromonomer comprising a hydrophobic portion and an alkoxylated portion, and
  (iv) a monoethylenically unsaturated monomer containing latent crosslinking functionality, wherein the amount of the monoethylenically unsaturated monomer containing latent crosslinking functionality is in a range that extends from greater than 5 weight percent to 50 weight percent, based on the total weight of the second polymer; and
(d) a third polymer comprising
  (i) an unsaturated carboxylic acid monomer;
  (ii) a monoethylenicaly unsaturated monomer different from the carboxylic acid monomer, and
  (iii) a monoethylenically unsaturated monomer containing latent crosslinking functionality;
wherein the unsaturated carboxylic acid monomer is present in an amount sufficient to keep the third polymer in solution.

7. A pigment grind comprising:
(a) at least one pigment;
(b) water; and
(c) a reactive diluent comprising the reaction product of
  (i) an unsaturated carboxylic acid monomer;
  (ii) a monoethylenicaly unsaturated monomer different from the carboxylic acid monomer, and
  (iii) a monoethylenically unsaturated monomer containing latent crosslinking functionality.

8. The aqueous coating composition of claim 1, wherein the solvent comprises water.

9. The aqueous coating composition of claim 1, wherein the polyamine compound is selected from oxalic dihydrazide, adipic dihydrazide, and sebacic dihydrazide.

10. The aqueous coating composition of claim 5, wherein the solvent comprises water.

11. The aqueous coating composition of claim 4-5, wherein the polyamine compound is selected from oxalic dihydrazide, adipic dihydrazide, and sebacic dihydrazide.

12. The aqueous coating composition of claim 6, wherein the solvent comprises water.

* * * * *

UNITED STATES PATENT AND TRADEMARK OFFICE
CERTIFICATE OF CORRECTION

PATENT NO. : 8,013,092 B1  
APPLICATION NO. : 11/961025  
DATED : September 6, 2011  
INVENTOR(S) : John M. Krajnik et al.

It is certified that error appears in the above-identified patent and that said Letters Patent is hereby corrected as shown below:

In the Claims

Column 18, Line 39, delete "4-5", and insert --5--.

Signed and Sealed this
Second Day of June, 2015

Michelle K. Lee
*Director of the United States Patent and Trademark Office*